United States Patent
Alterki et al.

(10) Patent No.: US 12,480,161 B1
(45) Date of Patent: Nov. 25, 2025

(54) IDENTIFICATION OF MICRORNA BIOMARKERS FOR DIAGNOSIS AND TREATMENT FOR SLEEP APNEA

(71) Applicants: Sabah Al-Ahmad Center for Giftedness and Creativity, Safat (KW); Dasman Diabetes Institute, Dasman (KW)

(72) Inventors: Abdulmohsen Alterki, Kuwait (KW); Fahd Al-Mulla, Kuwait (KW); Jehad Ahmed Abubaker, Kuwait (KW); Mohamed Abu-Farha, Kuwait (KW)

(73) Assignees: Sabah Al-Ahmad Center for Giftedness and Creativity, Safat (KW); Dasman Diabetes Institute, Dasman (KW)

( * ) Notice: Subject to any disclaimer, the term of this patent is extended or adjusted under 35 U.S.C. 154(b) by 0 days.

(21) Appl. No.: 19/196,434

(22) Filed: May 1, 2025

(51) Int. Cl.
  *C12Q 1/6883* (2018.01)
  *C07H 21/04* (2006.01)

(52) U.S. Cl.
  CPC ..... *C12Q 1/6883* (2013.01); *C12Q 2600/158* (2013.01); *C12Q 2600/178* (2013.01)

(58) Field of Classification Search
  None
  See application file for complete search history.

(56) References Cited

U.S. PATENT DOCUMENTS

| | | |
|---|---|---|
| 2017/0356046 A1 | 12/2017 | Barbe et al. |
| 2020/0157626 A1 | 5/2020 | Hicks et al. |
| 2022/0228213 A1* | 7/2022 | Grillari ............ C12Q 1/6851 |

OTHER PUBLICATIONS

"MicroRNA Sequencing Analysis in Obstructive Sleep Apnea and Depression: Anti-Oxidant and MAOA-Inhibiting Effects of miR-15b-5p and miR-92b-3p through Targeting PTGS1-NF-κB-SP1 Signaling", Publication date: Nov. 22, 2021.
Identification and validation of circulating miRNAs as endogenous controls in obstructive sleep apnea, Publication date: Mar. 13, 2019.
MicroRNA Profile of Cardiovascular Risk in Patients with Obstructive Sleep Apnea, Publication date: Nov. 18, 2020.
"Obstructive Sleep Apnea: A Look towards Micro-RNAs as Biomarkers of the Future", Publication date: Dec. 30, 2022.

* cited by examiner

*Primary Examiner* — Sean Mcgarry
(74) *Attorney, Agent, or Firm* — Nath, Goldberg & Meyer; Joshua B. Goldberg

(57) ABSTRACT

The present subject matter relates to a method of diagnosing and treating sleep apnea in a subject. The method may include determining whether the subject needs a polysomnography by obtaining a biological sample from the subject to determine if the subject has a microRNA selected from the group consisting of miRNA-30b-5p, miRNA-30c-5p, miRNA-19b-3p, and miRNA-23b-5p. The expression of one of the microRNAs may be associated with the presence of SA in a subject. If the subject has a microRNA associated with the presence of SA, then the method includes conducting a Polysomnography on the subject to further determine if the subject has SA. If the subject is further determined to have SA, the method may then include treating the subject with a treatment of SA selected from the group consisting of ENT multilevel surgery, continuous positive airway pressure (CPAP) therapy, and bariatric surgery.

20 Claims, 5 Drawing Sheets

Specification includes a Sequence Listing.

SEQUENCE LISTING

```
Sequence total quantity: 4
SEQ ID NO: 1            moltype = RNA  length = 23
FEATURE                 Location/Qualifiers
source                  1..23
                        mol_type = other RNA
                        organism = Homo sapiens
SEQUENCE: 1
tgtgcaaatc catgcaaaac tga                                             23

SEQ ID NO: 2            moltype = RNA  length = 22
FEATURE                 Location/Qualifiers
source                  1..22
                        mol_type = other RNA
                        organism = Homo sapiens
SEQUENCE: 2
tgggttcctg gcatgctgat tt                                              22

SEQ ID NO: 3            moltype = RNA  length = 22
FEATURE                 Location/Qualifiers
source                  1..22
                        mol_type = other RNA
                        organism = Homo sapiens
SEQUENCE: 3
tgtaaacatc ctacactcag ct                                              22

SEQ ID NO: 4            moltype = RNA  length = 23
FEATURE                 Location/Qualifiers
source                  1..23
                        mol_type = other RNA
                        organism = Homo sapiens
SEQUENCE: 4
tgtaaacatc ctacactctc agc                                             23
```

IDENTIFICATION OF MICRORNA BIOMARKERS FOR DIAGNOSIS AND TREATMENT FOR SLEEP APNEA

SEQUENCE LISTING

The instant application contains a Sequence Listing which has been submitted in WIPO Sequence format via Patent Center and is hereby incorporated by reference in its entirety. Said WIPO Sequence copy, created on Apr. 9, 2025, and modified on Jul. 29, 2025, is named 3306089u_modified_08082025.txt and is 5,000 bytes in size.

BACKGROUND

1. Field

The present disclosure relates to a method for diagnosing and treatment of sleep apnea.

2. Description of the Related Art

Sleep Apnea (SA) is a prevalent condition characterized by repetitive episodes of complete or partial upper airway obstruction during sleep, leading to reduced oxygen saturation and disrupted sleep. Currently, the diagnosis of Sleep Apnea (SA) is primarily reliant on Polysomnography (PSG), which is costly and not widely accessible. Furthermore, there is a lack of reliable biomarkers to diagnose SA or predict treatment response in SA patients. There is an urgent need for non-invasive, accessible biomarkers that can aid in the diagnosis of SA and predict the efficacy of various treatments, including ENT (ear, nose, and throat) multilevel surgery, continuous positive airway pressure (CPAP) therapy, and bariatric surgery.

Thus, new methods of diagnosing SA and solving the aforementioned problems are desired.

SUMMARY

The present subject matter relates to medical diagnostics and treatment, with a focus on identifying miRNA biomarkers predictive of Sleep Apnea (SA). These miRNAs can be used to determine the need for a sleep study and assess the effectiveness of subsequent treatments. SA affects approximately 20% of the population and is strongly linked to conditions such as diabetes, cardiovascular disease, heart dysfunction, obesity, metabolic disorders, and increased mortality risk. Most people with SA remain undiagnosed and untreated due to the limited availability of sleep labs, high costs, and inaccessibility. A simple, well-validated test capable of detecting miRNA marker signatures for SA may enable mass screening, allowing proper identification of individuals who need sleep studies and appropriate treatment.

The present subject matter relates to a method of diagnosing and treating SA in a subject. The method may include determining whether the subject needs a Polysomnography (PSG) by obtaining a biological sample from the subject and determining if the subject has a microRNA selected from the group consisting of miRNA-30b-5p, miRNA-30c-5p, miRNA-19b-3p, and miRNA-23b-5p. The expression of one of the microRNAs may be associated with the presence of SA in a subject. If the subject has a microRNA associated with the presence of SA, then the method includes conducting a PSG on the subject to further determine if the subject has SA. If the subject is further determined to have SA, the method may then include treating the subject with a treatment of SA selected from the group consisting of ENT multilevel surgery, continuous positive airway pressure (CPAP) therapy, and bariatric surgery.

The method may further include taking an additional biological sample from the subject in a timeframe of 3 months to 6 months after the treatment of SA and detecting a new level of the microRNA. If no difference in the new level of the microRNA is detected, then the method may include administering a new treatment for SA to the subject.

Determining if the subject has a microRNA selected from the group consisting of miRNA-30b-5p, miRNA-30c-5p, miRNA-19b-3p, and miRNA-23b-5p may be achieved using any diagnostic testing method now known or later developed capable of detecting microRNA in a sample. In a non-limiting example, the determining may comprise nucleic acid amplification-based methods, droplet digital PCR, electrochemiluminescence methods, surface-enhanced Raman spectroscopy, mass spectrometry, RNA sequencing, microarrays, reverse transcription PCT, next generation sequencing (NGS), or the like. In a particular embodiment, this determining step may comprise performing NGS on the biological sample.

These and other features of the present subject matter will become readily apparent upon further review of the following specification.

DETAILED DESCRIPTION OF THE PREFERRED EMBODIMENTS

Figure 1:
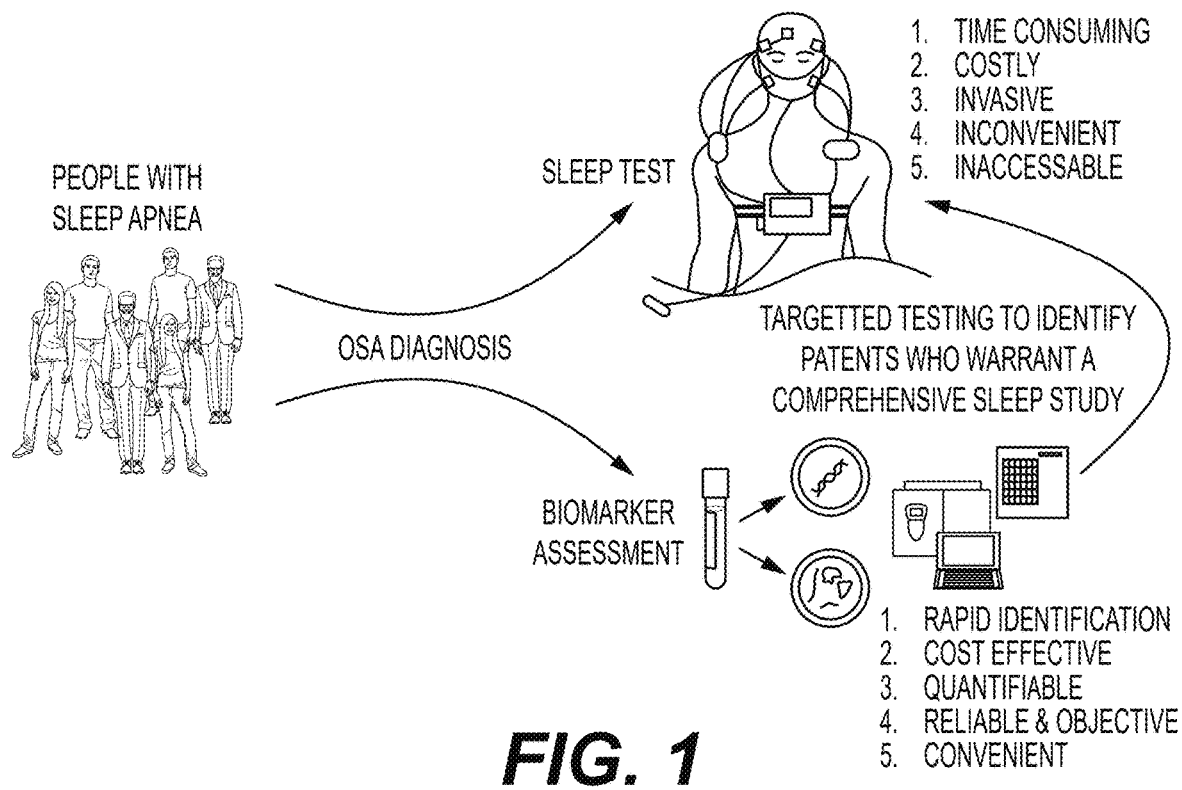
FIG. 1 depicts a diagram of biomarker screening with sleep testing for sleep SA diagnosis.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment of a condition, disorder, or disease, such as sleep apnea or obstructive sleep apnea.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to medical diagnostics and treatment, with a focus on identifying miRNA biomarkers predictive of SA. These miRNAs can be used to determine the need for a sleep study and assess the effectiveness of subsequent treatments. SA affects approximately 20% of the population and is strongly linked to conditions such as diabetes, cardiovascular disease, heart dysfunction, obesity, metabolic disorders, and increased mortality risk. Most people with SA remain undiagnosed and untreated due to the limited availability of sleep labs, high costs, and inaccessibility. A simple, well-validated test capable of detecting miRNA marker signatures for SA would enable mass screening, allowing proper identification of individuals who need sleep studies and appropriate treatment (FIG. 1).

Furthermore, these biomarkers could be tracked over time to monitor treatment efficacy and guide adjustments as needed. The method described herein may be used by all health care providers, including doctors dealing with patients diagnosed with SA, sleep disturbances, prediabetes, diabetes, cardiovascular disease, obesity, sexual and metabolic dysfunctions. In addition, biosensors and biomonitoring devices (point-of-care diagnostics) that detect any combination or all the miRNAs from bodily fluids may be used directly by individuals for self-diagnosis.

The present subject matter relates to a method of diagnosing and treating SA in a subject. The method may include determining whether the subject needs a PSG by obtaining a biological sample from the subject and determining if the subject has a microRNA selected from the group consisting of miRNA-30b-5p, miRNA-30c-5p, miRNA-19b-3p, and miRNA-23b-5p. In various embodiments, testing for levels of various microRNAs may be performed using any means now known or developed in the future to detect microRNA. The expression of one of the miRNAs may be associated with the presence of SA in a subject. If the subject has a microRNA associated with the presence of SA, the method may include conducting a PSG on the subject to further determine if the subject has SA. If the subject is further determined to have SA, the method may include treating the subject with a treatment of SA selected from the group consisting of ENT multilevel surgery, continuous positive airway pressure (CPAP) therapy, and bariatric surgery.

Determining if the subject has a microRNA selected from the group consisting of miRNA-30b-5p, miRNA-30c-5p, miRNA-19b-3p, and miRNA-23b-5p may be achieved using any diagnostic testing method now known or later developed capable of detecting microRNA in a sample. In a non-limiting example, the determining may comprise nucleic acid amplification-based methods, droplet digital PCR, electrochemiluminescence methods, surface-enhanced Raman spectroscopy, mass spectrometry, RNA sequencing, microarrays, reverse transcription PCT, next generation sequencing (NGS), or the like. In a particular embodiment, this determining step may comprise performing NGS on the biological sample.

In an embodiment, the level of expression of the microRNA in a subject may be based on a level of the microRNA in a group of subjects that tested positive for SA in a Polysomnography PSG.

In various embodiments, the biological sample may be selected from the group consisting of plasma, blood, urine, and saliva. In particular embodiments, the biological sample may be plasma.

In other embodiments, the method may further include taking an additional biological sample from the subject in a timeframe of 3 months to 6 months after the treatment of SA and detecting a new level of the microRNA associated with SA. If no difference in the new level of the microRNA is detected, then the method may include administering a new treatment for SA to the subject.

In another embodiment, the present subject matter may relate to a method of diagnosing and treating sleep apnea (SA) in a subject. The method may include obtaining a biological sample from the subject and detecting in the biological sample the presence of a microRNA selected from the group consisting of miRNA-30b-5p, miRNA-30c-5p, miRNA-19b-3p, and miRNA-23b-5p. The presence of one of the microRNAs may be associated with the presence of SA in the subject based on a level of the microRNA in subjects that tested positive for SA in a Polysomnography (PSG). If the presence of the microRNA is detected in the subject at a level associated with SA, then the method may include treating the subject with a treatment of SA selected from the group consisting of ENT multilevel surgery, continuous positive airway pressure (CPAP) therapy, and bariatric surgery.

The nucleic acid sequence of the microRNA hsa-miR-19b-3p, as listed in miRbase.org, has accession number MIMAT0000074, and has a mature sequence of: UGUGCAAAUCCAUGCAAAACUGA (SEQ ID NO: 1).

The nucleic acid sequence of the microRNA hsa-miR-23b-5p, as listed in miRbase.org, has accession number MIMAT0004587, and has a mature sequence of: UGGGUUCCUGGCAUGCUGAUUU (SEQ ID NO: 2).

The nucleic acid sequence of the microRNA hsa-miR-30b-5p, as listed in miRbase.org, has accession number MIMAT0000420, and has a mature sequence of: UGUAAACAUCCUACACUCAGCU (SEQ ID NO: 3).

The nucleic acid sequence of the microRNA hsa-miR-30c-5p is as listed in miRbase.org, has accession number MIMAT0000244, and has a mature sequence of: UGUAAACAUCCUACACUCUCAGC (SEQ ID NO: 4).

In some embodiments, detecting the presence of a microRNA selected from the group consisting of miRNA-30b-5p, miRNA-30c-5p, miRNA-19b-3p, and miRNA-23b-5p may comprise detecting the presence of a mature miRNA sequence about 95% identical to a microRNA sequence selected from the group consisting of SEQ ID NO: 1, SEQ ID NO: 2, SEQ ID NO: 3, and SEQ ID NO: 4.

In various embodiments, the biological sample may be selected from the group consisting of plasma, blood, urine, and saliva. In particular embodiments, the biological sample is plasma.

In some embodiments, the method may further include taking an additional biological sample from the subject in a timeframe of 3 months to 6 months after the treatment of SA and detecting a new level of the microRNA. If no difference in the new level of the microRNA is detected, then a new treatment may be administered to the subject.

In other embodiments, the biological sample may be tested using performed NGS.

In still other embodiments, the treatment of SA used may be based on the microRNA detected.

Examples

For small RNA and miRNA profiling analysis, next-generation sequencing (NGS) with the Illumina NovaSeq 6000 Sequencing System was used.

The relevant miRNA, miRNA-140-3p, miRNA-30b-5p, miRNA-30c-5p, miRNA-146b-5p, miRNA-29a-3p, niR-29b-3p, miRNA-19b-3p, miRNA-23b-5p, and miRNA-191-5p, were discovered in a cohort of SA subjects undergoing SA therapy using blood, urine or saliva. Utilizing NGS, these biomarkers were evaluated both at baseline and three months post-treatment. This method assesses their diagnostic potential in identifying SA and predicting subject response to SA therapy.

The miRNAs were extracted from plasma using small RNA extraction kits and analyzed with miRNA sequencing kit via next-generation sequencing approach. The levels of miRNA across samples were evaluated and correlated with various SA indices, such as an apnea index (AI) and the apnea-hypopnea index (AHI), obtained through polysomnography, to confirm their comparable diagnostic potential.

Figure 2A:
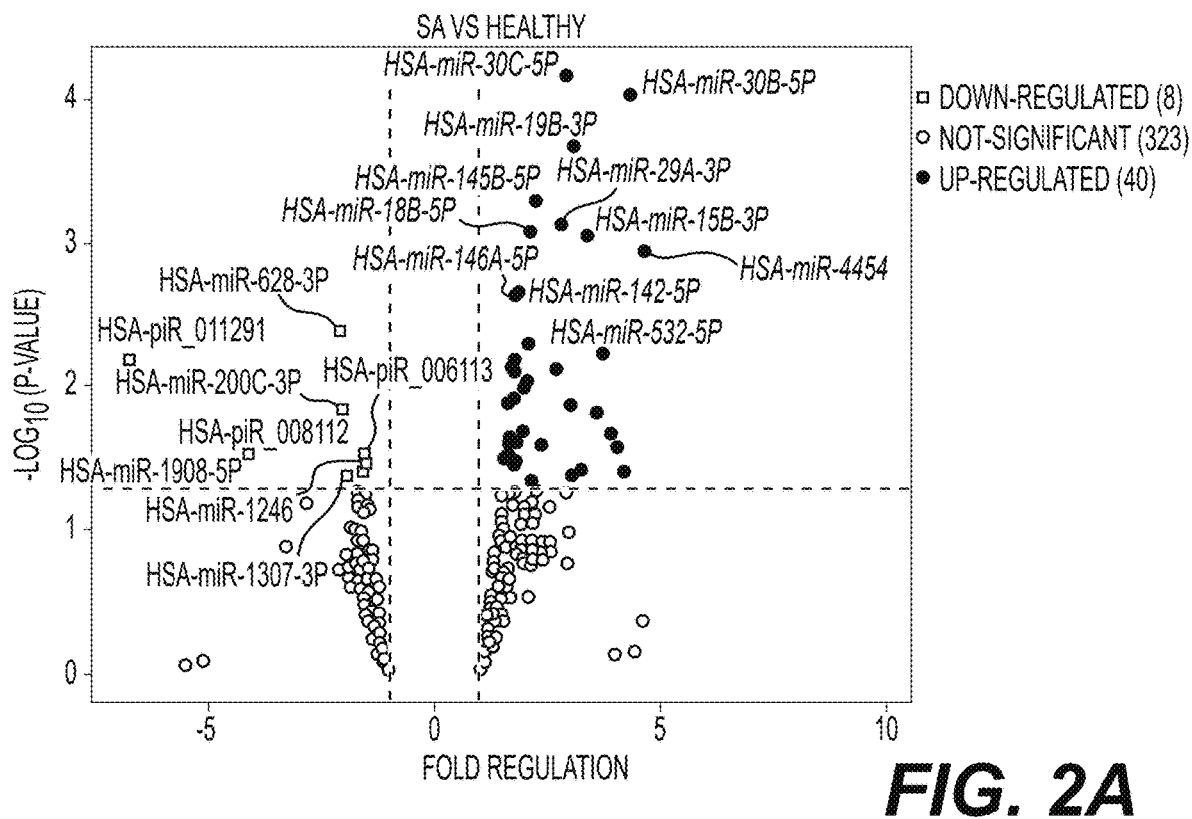
FIG. 2A is a graph showing miRNA expression in healthy individuals compared with individuals diagnosed with SA.

The levels of miRNA were measured in both SA subjects and healthy controls at the time of diagnosis, and their diagnostic potential was compared to polysomnography, the gold standard methods for sleep apnea diagnosis. Additionally, these molecules were evaluated in SA subjects after 3-6 months of intervention to assess their response to treatment as shown in FIGS. 2A-2D. FIG. 2A is a graph comparing the presence and amount of certain miRNA in subjects diagnosed with SA compared with healthy individuals with no signs of SA.

Figures 2B, 2C:
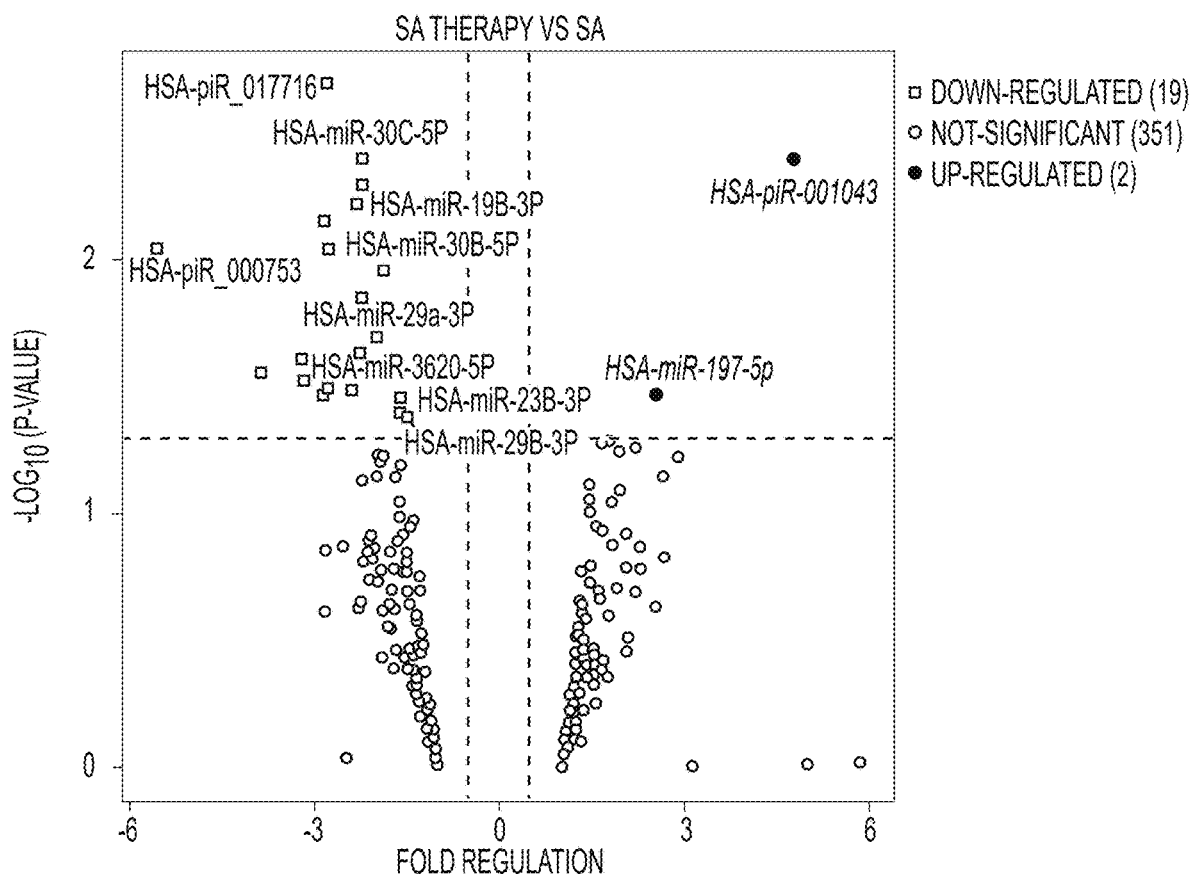
FIG. 2B is a graph showing miRNA expression in subjects having undergone therapy for SA compared with individuals diagnosed with SA.
FIG. 2C is a Venn-diagram showing the overlap of miRNA expressed in SA diagnosis vs Healthy Individuals and SA therapy with SA diagnosis.
Figure 2D:
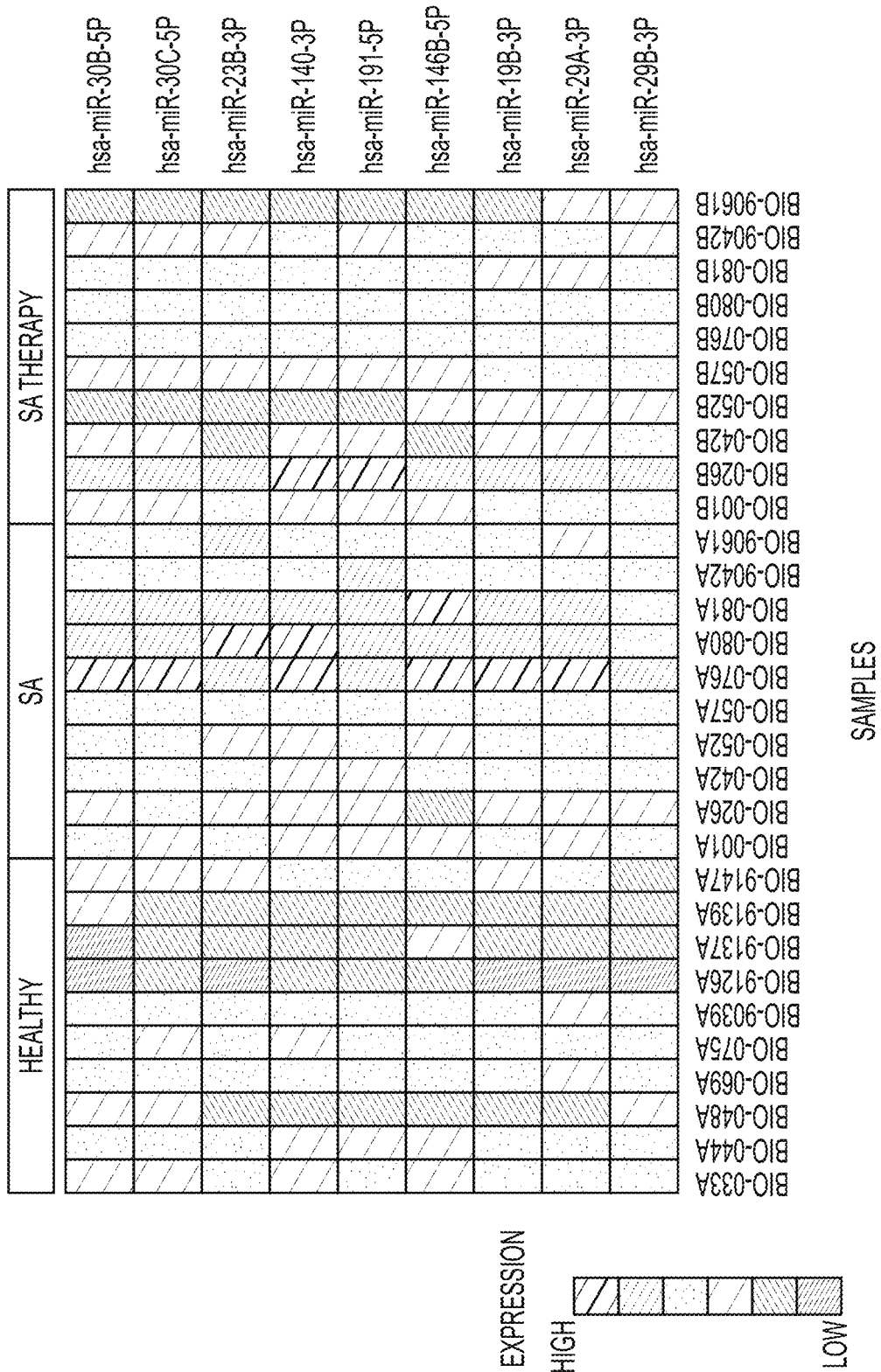
FIG. 2D shows the levels of expression of miRNA in healthy individuals, individuals diagnosed with SA and individuals that have undergone SA therapy.
Figure 3A:
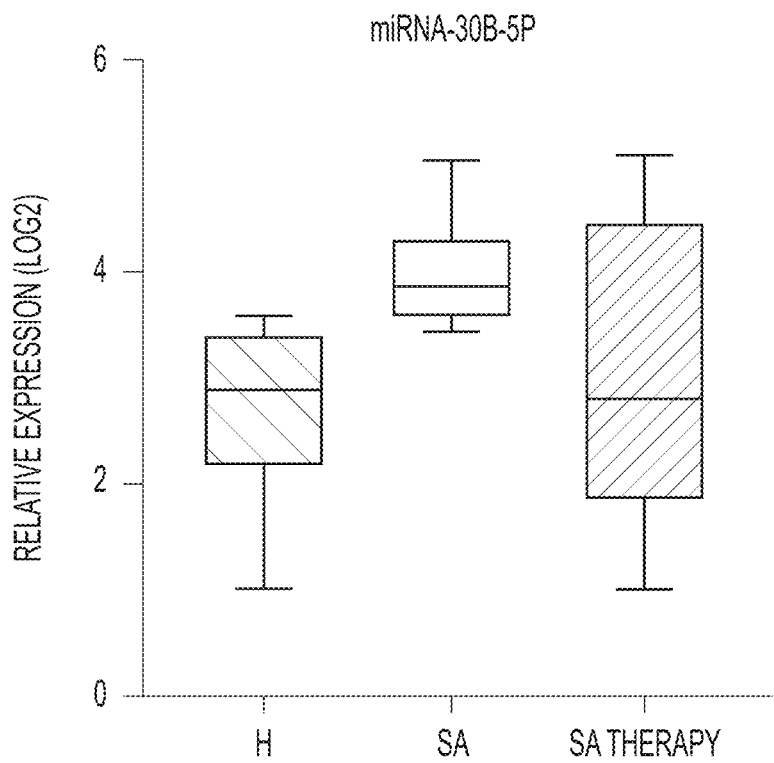
FIG. 3A is a graph showing levels of the miRNA-30b-5p microRNA in a healthy group (H), individuals diagnosed with SA, and individuals having undergone SA therapy.
Figure 3B:
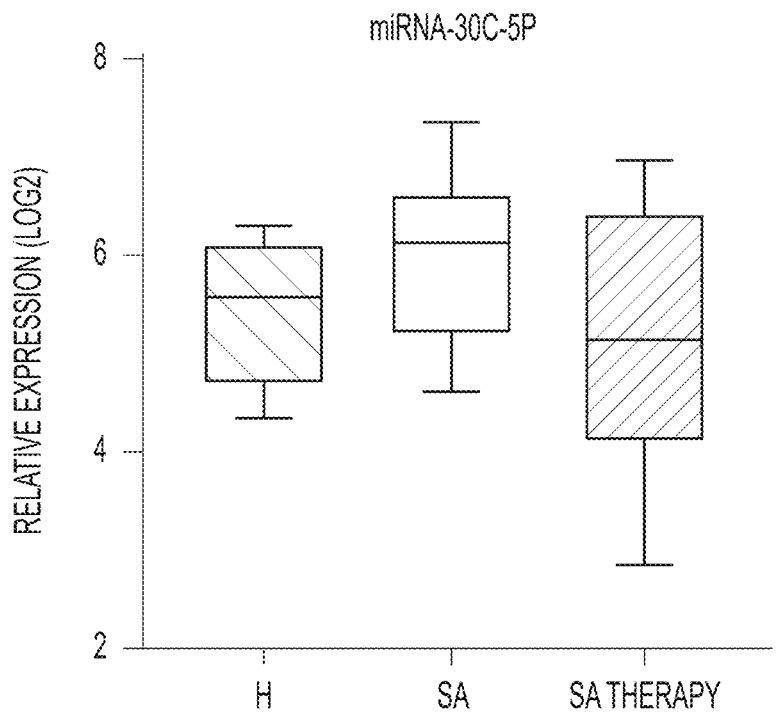
FIG. 3B is a graph showing levels of the miRNA-30c-5p microRNA in a healthy group (H), individuals diagnosed with SA, and individuals having undergone SA therapy.
Figure 3C:
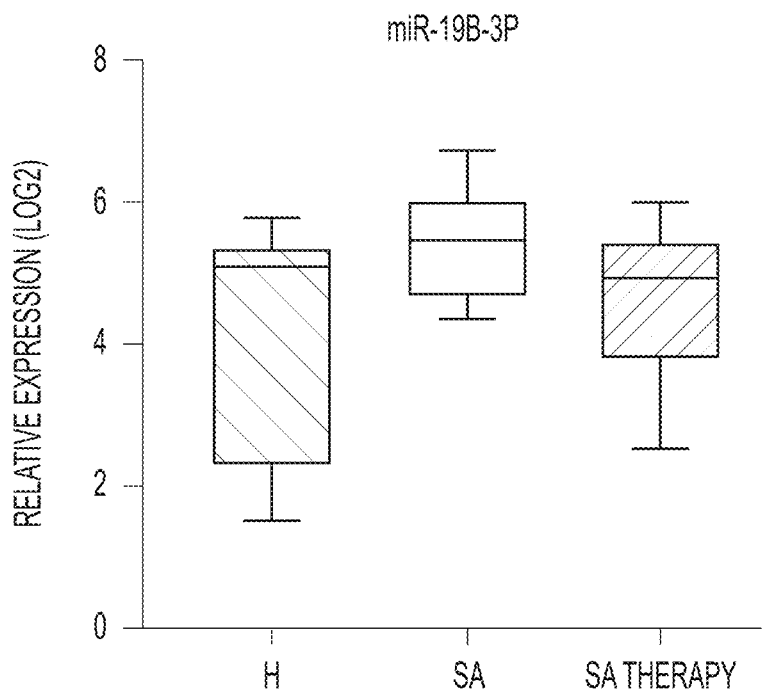
FIG. 3C is a graph showing levels of the miRNA-19b-3p microRNA in a healthy group (H), individuals diagnosed with SA, and individuals having undergone SA therapy.
Figure 3D:
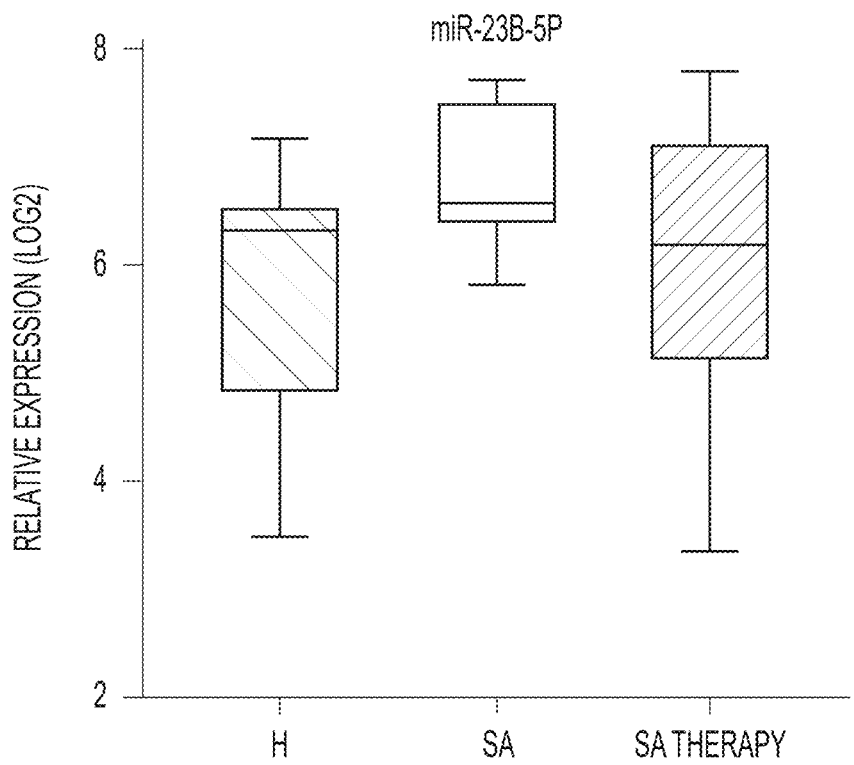
FIG. 3D is a graph showing levels of the miRNA-23b-5p microRNA in a healthy group (H), individuals diagnosed with SA, and individuals having undergone SA therapy.

The treatment response was assessed after a minimum follow-up period of 3 months post-intervention, with an average follow-up duration of 5 months. FIG. 2B is a graph showing the presence and amount of the miRNA in patients that have undergone SA therapy with the amounts at the time of diagnosis of the SA. This timeframe is generally sufficient, based on earlier reports, to observe the necessary changes or improvements resulting from therapy. FIG. 2C is a Venn-diagram showing the overlap of nine miRNA between patients diagnosed with SA and healthy individuals compared with patients that have undergone therapy for SA and patients diagnosed with SA. The data is also shown in Table 1. Finally, the level of expression of the miRNA in each of the three groups, healthy, SA, and SA therapy, is show in FIG. 2D.

TABLE 1

| S. No. | miRNA | SA v Healthy | | SA therapy vs SA | |
| --- | --- | --- | --- | --- | --- |
| | | Fold Regulation | p-value | Fold Regulation | p-value |
| 1 | hsa-miRNA-30b-5p | 4.33 | 0.0001 | −2.86 | 0.007 |
| 2 | hsa-miRNA-19b-3p | 3.07 | 0.0002 | −2.33 | 0.006 |
| 3 | hsa-miRNA-30c-5p | 2.93 | 0.0007 | −2.22 | 0.004 |
| 4 | hsa-miRNA-29a-3p | 2.82 | 0.001 | −2.22 | 0.014 |
| 5 | hsa-miRNA-146b-5p | 2.26 | 0.001 | −1.89 | 0.011 |
| 6 | hsa-miRNA-29b-3p | 1.96 | 0.011 | −1.61 | 0.04 |
| 7 | hsa-miRNA-140-3p | 1.8 | 0.008 | −1.59 | 0.05 |
| 8 | hsa-miRNA-23b-3p | 1.74 | 0.012 | −1.61 | 0.035 |
| 9 | hsa-miRNA-191-5p | 1.63 | 0.013 | −1.52 | 0.042 |

Referring to FIGS. 3A-3D, the levels of the microRNAs, miRNA-30b-5p (FIG. 3A), miRNA-30c-5p (FIG. 3B), miRNA-19b-3p (FIG. 3C), and miRNA-23b-3p (FIG. 3D) in the three test groups, Healthy (H), Sleep Apnea (SA), and Sleep Apnea (SA) therapy are compared in the graphs.

The levels of these markers were compared to various sleep indices, such as sleep oxygenation, AI, and AHI scores, obtained through polysomnography conducted in a sleep laboratory. Strong and significant correlations were observed between the markers and the AI and AHI readings, supporting their diagnostic and predictive potential for identifying SA.

It is to be understood that the method of diagnosing and treating SA described are not limited to the descriptions herein, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of diagnosing and treating sleep apnea in a subject, the method comprising:
determining whether the subject needs a polysomnography by:
obtaining a biological sample from the subject;
determining if the subject has a microRNA selected from the group consisting of miRNA-30b-5p, miRNA-30c-5p, miRNA-19b-3p, and miRNA-23b-5p by testing the biological sample for the presence of a miRNA at least 95% identical to a microRNA sequence selected from the group consisting of SEQ ID NO: 1, SEQ ID NO: 2, SEQ ID NO: 3, and SEQ ID NO: 4, wherein expression of one of the microRNA is associated with the presence of SA in a subject;
conducting a Polysomnography (PSG) on the subject to further determine if the subject has SA; and
treating the subject with a treatment of SA selected from the group consisting of ENT multilevel surgery, continuous positive airway pressure (CPAP) therapy, and bariatric surgery.

2. The method of claim 1, wherein the level of expression of the microRNA in a subject is based on a level of the microRNA in a group of subjects that tested positive for SA in a Polysomnography.

3. The method of claim 1, wherein the biological sample is selected from the group consisting of plasma, blood, urine, and saliva.

4. The method of claim 3, wherein the biological sample is plasma.

5. The method of claim 1, further comprising taking an additional biological sample from the subject in a timeframe comprising 3 months to 6 months after the treatment of SA and detecting a new level of the microRNA.

6. The method of claim 5, wherein if no difference in the new level of the microRNA is detected, then administering a new treatment for SA to the subject.

7. The method of claim 1, comprising testing the biological sample for the presence of SEQ ID: No. 1.

8. The method of claim 1, comprising testing the biological sample for the presence of SEQ ID: No. 2.

9. The method of claim 1, comprising testing the biological sample for the presence of SEQ ID: No. 3.

10. The method of claim 1, comprising testing the biological sample for the presence of SEQ ID: No. 4.

11. A method of diagnosing and treating sleep apnea (SA) in a subject, the method comprising:

obtaining a biological sample from the subject;

determining if the subject has a microRNA selected from the group consisting of miRNA-30b-5p, miRNA-30c-5p, miRNA-19b-3p, and miRNA-23b-5p by testing the biological sample for the presence of a miRNA at least 95% identical to a microRNA sequence selected from the group consisting of SEQ ID NO: 1, SEQ ID NO: 2, SEQ ID NO: 3, and SEQ ID NO: 4, wherein expression of one of the microRNA is associated with the presence of SA in a subject;

wherein the presence of one of the microRNAs is associated with the presence of SA in a subject based on a level of the microRNA in a group of subjects that tested positive for SA in a Polysomnography; and treating the subject with a treatment of SA selected from the group consisting of ENT multilevel surgery, continuous positive airway pressure (CPAP) therapy, and bariatric surgery.

12. The method of claim 11, wherein the biological sample is selected from the group consisting of plasma, blood, urine, and saliva.

13. The method of claim 12, wherein the biological sample is plasma.

14. The method of claim 11, further comprising taking an additional biological sample from the subject in a timeframe comprising 3 months to 6 months after the treatment of SA; detecting a new level of the microRNA; and if no difference in the new level of the miRNA is detected, a new treatment is administered to the subject.

15. The method of claim 11, wherein the biological sample is tested using performed next-generation sequencing.

16. The method of claim 11, wherein the treatment of SA used is based on the microRNA detected.

17. The method of claim 1, comprising testing the biological sample for the presence of SEQ ID: No. 1.

18. The method of claim 1, comprising testing the biological sample for the presence of SEQ ID: No. 2.

19. The method of claim 1, comprising testing the biological sample for the presence of SEQ ID: No. 3.

20. The method of claim 1, wherein miRNA-30b-5p has the SEQ ID: No. 3 and miRNA-30c-5p has the SEQ ID: No. 4.

* * * * *